United States Patent [19]

Clark

[11] 4,103,155

[45] Jul. 25, 1978

[54] POSITIONAL SENSOR-OPERATOR SYSTEM

[76] Inventor: Malcolm D. Clark, 4 St. Ronans Dr., Glascow G413 SJ, Scotland

[21] Appl. No.: 732,348

[22] Filed: Oct. 14, 1976

[30] Foreign Application Priority Data

Oct. 16, 1975 [GB] United Kingdom ............... 42406/75

[51] Int. Cl.² .............................................. G01D 5/34
[52] U.S. Cl. .......................... 250/231 SE; 250/211 K
[58] Field of Search ..... 250/231 R, 231 SE, 231 GY, 250/237 R, 237 G, 211 K, 227; 356/209, 169, 170, 212; 340/347 P; 324/175, 178

[56] References Cited

U.S. PATENT DOCUMENTS

| 2,480,134 | 8/1949 | Harrington | 250/231 R |
| 3,358,150 | 12/1967 | Summer | 250/211 K |
| 3,399,347 | 8/1968 | Martens | 250/227 |
| 3,566,132 | 12/1967 | Walker | 356/212 |
| 3,846,701 | 11/1974 | Sampey | 324/178 |

Primary Examiner—David C. Nelms
Attorney, Agent, or Firm—Browning, Bushman & Zamecki

[57] ABSTRACT

The present invention pertains to a system used in conjunction with a rotary member such as a shaft to sense the angular position of the rotary member and produce an output signal which is a function thereof. The signal is received by operator means for producing a programmed response to the signal. The system comprises a light reflective program carried by the rotary member, its length extending in a circumferential direction with respect to the rotary member and its width varying along its length as a function of lengthwise distance from one end of the program area. The system further comprises means for projecting light onto at least a part of the program area over an extent transverse to the program area at least as broad as the maximum width of the program area and primary detector means operative to detect the amount of light being reflected from the entire width of a limited lengthwise portion of the program area aligned with the primary detector means. The primary detector means is disposed opposite the program area whereby successive lengthwise portions of the program area will pass the primary detector means as the rotary member is rotated, the primary detector means being operative to produce the output signal.

24 Claims, 12 Drawing Figures

POSITIONAL SENSOR-OPERATOR SYSTEM

BACKGROUND OF THE INVENTION

1. Field of the Invention

The present invention pertains to systems for sensing the angular position of a rotary shaft or other member. In particular, the invention pertains to a system associated with such a rotary member and comprising an operator for producing a programmed response in accordance with the angular position of the rotary member. The invention finds application in many fields including that of rotary valves. It may be used to indicate the position of the rotary valve stem or the coaxial shaft of an actuator for the valve and thus the position of the attached valve element whether it be open, closed, or in some intermediate position. It can also be used to produce some other programmed response to the valve stem, actuator shaft and/or valve element position. For example, it may be associated with the valve actuator so that the speed of rotation of the valve is controlled as a function of the position of the valve stem, actuator shaft and/or valve element.

2. Brief Description of the Prior Art

One of the most common approaches in such systems in the past has been to connect a potentiometer to the rotary member whose angular position is to be sensed. The potentiometer was, in some cases, directly mechanically connected to the rotary member and, in other cases, indirectly mechanically connected to the rotary member via a linkage of gears or the like. In either case, the potentiometer would be driven by the rotary member and would produce an output voltage proportional to the position of the rotary member.

This approach has numerous disadvantages. One of these is that the various parts, being mechanically connected to one another, are subject to wear and backlash leading to inaccuracy in the position sensing particularly as the system ages. The windings of the potentiometer are also subject to wear and this can cause complete failure of the sensing apparatus. Furthermore, such systems are quite expensive due to the mechanical complexity and to the need to use high quality parts in an effort to combat wear and backlash problems.

U.S. Pat. No. 3,828,188 to Matula briefly describes a prior art system in which a mirror rotates with a tension arm and reflects greater or lesser amounts of light from an external light source. This system appears to lack the precision and versatility required in many of the applications of the present invention. Furthermore, the system is adapted for relatively light duty rotary machinery such as tape decks and would not be suitable for use with apparatus such as valves and valve actuators which are subjected to much more abuse.

U.S. Pat. Nos. 3,767,992 and 3,770,965 to Edwards et al. disclose somewhat more sophisticated systems in which a control device limits the amount of light either reflected from or transmitted across the control device. These systems also lack the precision and versatility required in many applications. In particular, they lack means for limiting the light reflected from or transmitted across the control device to a relatively small area so that small increments of movement of the control device can be detected. Additionally, the Edwards systems fail to provide adequate isolation of the light detection member from light sources other than the control device. Neither the Matula nor the Edwards et al patents disclose any way of applying their respective systems to rotary valves and actuators, one of the primary environments of interest in the present invention.

Still another system is briefly disclosed in *Machine Design*, Feb. 6, 1975. This system is based on light transmission rather than light reflection. Thus it uses considerably more space than is desirable and requires a separate member for the control device rather than allowing it to be incorporated on or in a rotary part already present in the rotary apparatus. Furthermore, the system lacks versatility in that the configuration of the light transmission limiting area is not readily altered.

All of the above-described prior art systems have disadvantages in terms of undue weight and expense.

SUMMARY OF THE INVENTION

The present invention comprises a positional sensor and/or operator system comprising a light reflective program area carried by the rotary member to rotate therewith. The length of the program area extends in a circumferential direction with respect to the rotary member, and the width of the program area varies along its length as a function of lengthwise distance from one end of the program area. Thus the width of the program area at any given location along its length is indicative of the angular position of the rotary member. The system further comprises means for projecting light onto at least a part of the program area over an extent at least as broad as the maximum width of the program area and primary detector means operative to detect the amount of light being reflected from the entire width of a limited lengthwise portion of the program area aligned with the primary detector means. The primary detector means is disposed opposite the program area whereby successive lengthwise portions of the program area will pass the primary detector means as the rotary member is rotated. The primary detector means produces an output signal, e.g. an electrical current or a voltage, which is a function of the width of the program area, and this signal is received by an operator means connected to the primary detector means. The operator means is operative to produce a programmed response to the output signal. For example, it may be used to program the angular speed of the very rotary member whose position is being sensed and/or to indicate its angular position.

Although the invention is useful in connection with many types of rotary members, it is particularly applicable to rotary valves and their actuators. The program area is preferably provided on a film member which may be carried by the valve stem (or a rigid coaxial extension thereof), the shaft of the valve actuator or any other suitable part rotating with the valve element.

The primary detector means may be mounted in the same housing with the light projecting means but sealed from direct photo communication therewith. The primary detector means may comprise a photocell or photomultiplier disposed in a chamber in the housing facing a slit lying opposite and transverse to the program area. The slit length is sized to admit light from the entirety of the maximum width of the program area measured in the direction of the slit. Alternatively, the primary detector means may comprise a bundle of optical fibers with their ends forming an elongate array in the same general disposition with respect to the program area as the above-mentioned slit. A sensing device such as a photodiode is attached to the fibers to sense the amount of light being carried by the fibers and produce the output signal.

In either embodiment, there is precise control of the light which reaches the primary detector means. The system can be designed so that the width of the slit or of the array of fiber ends is the limiting factor on the length of the lengthwise portion of the program area from which light is reflected. This limit can thus be made quite small so that very tiny increments of angular movement of the rotary member can be detected. Also, the slit or array of fiber ends is preferably located quite close to the program area so that extraneous light is effectively prevented from reaching the primary detector means. Yet the rotary member and its program area are spaced slightly from the slit or fiber array. Backlash and wear due to friction, mechanical interconnections, etc. are thus totally eliminated from the system.

The system may also be equipped with means to compensate for dulling of the reflective material of the program area and/or the light projecting source. This may comprise a reflective reference area of the same reflective material as the program area and generally paralleling the program area, but of substantially uniform width. The reference area is illuminated by the same light projecting means as the program area, but a separate auxiliary detector means is provided to sense the amount of light being reflected from the reference area. Means are provided for producing a net output signal which is a function of the difference between the output signals of the primary and auxiliary detector means. The operator means is directly responsive to the net output signal and, thus, indirectly responsive to the output signal of the primary detector means.

In the preferred embodiment, the program area is carried by a film member, preferably having an adhesive backing, which may be placed directly on some rotary part of the apparatus or on a special carrying member provided for the purpose. It will be appreciated that the use of film has great advantages of light weight and low cost. Furthermore, the film provides great versatility in the system as the program is easily changed by either removing and replacing the film member or by covering one film member and emplacing another.

Accordingly, it is a principle object of the present invention to provide an improved means for producing a programmed response to the angular position of a rotary member.

Another object of the invention is to provide a positional sensor-operator system which is especially adapted for use with rotary valves and valve actuators.

Still another object of the present invention is to provide a positional sensor-operator system which permits precise detection of very slight increments of movements of the associated rotary member.

A further object of the invention is to provide a positional sensor-operator system which effectively eliminates light from extraneous sources from reaching the detection means.

Still another object of the invention is to provide a positional sensor-operator system which is inexpensive, lightweight, versatile, and conservative of space.

Additional objects, features, and advantages of the present invention will be made apparent by the following description of the preferred embodiments, the drawings, and the claims.

DESCRIPTION OF THE PREFERRED EMBODIMENTS

Figure 1:
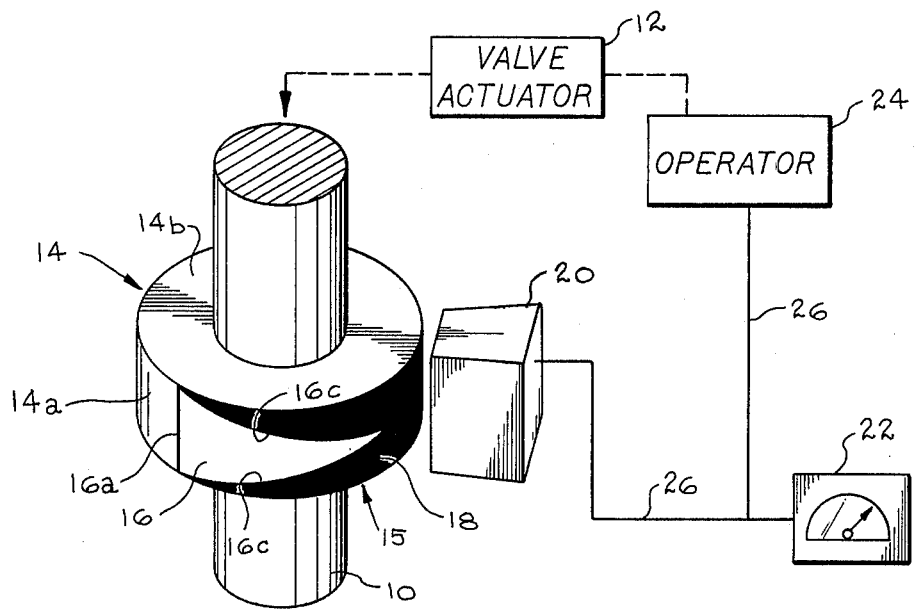
FIG. 1 is a diagrammatic representation of a system according to the invention.

Referring now to FIG. 1 there is shown a system including a rotary shaft 10 which rotates with a rotary valve element (not shown) such as in a butterfly valve, ball valve, etc. Shaft 10 may be the valve stem or an extension thereof. Other rotary members which rotate with the valve element such as a shaft or journal in the valve actuator which engages and rotates with the valve stem could also be used. A valve actuator diagrammatically indicated at 12 serves to rotate the shaft 10 to open and close the associated valve. In accord with the present invention there is provided a program carrying disc 14 rigidly mounted on the shaft 10 to rotate therewith. Disc 14 has a radially directed surface 14a and two axially directed surfaces one of which is shown at 14b.

A film member 15 whose width is approximately the same as that of the radially directed surface 14a is applied to the surface 14a as by means of an adhesive backing on the rear face of the film which lies adjacent the surface 14a. The front face of the film member 15 has a program area 16 of light reflective material such as white paint, metal foil, etc. The program area 16 has a wide first end 16a, a pointed second end 16b, and side edges 16c which taper linearly from end 16a to end 16b (see FIG. 7). The remainder of the front face of the film member 15 comprises two non-reflective areas 18 adjacent the side edges 16c of the program area 16. Areas 18 may, for example, be flat black.

When the film member 15 is applied to the surface 14a as shown in FIG. 1, the lengthwise dimension of program area 16 extends in a circumferential direction with respect to shaft 10 and is indirectly carried by shaft 10 via the disc 14 and the attached film member 15. The width of the program area 16, measured between the side edges 16c, varies as a linear function of lengthwise distance from end 16a and as a different linear function of lengthwise distance from end 16b. Lengthwise distance along program area 16 from one end of the program area is proportional to angular position with respect to that end; thus the width of the program area 16 may be considered a linear function of either of these two variables.

The varying width of program area 16 provides a program for the control of an indicator operator 22 and another operator 24. The program is transmitted to indicator 22 and operator 24 from a light projection-detection unit 20. As will be explained more fully below, unit 20 projects light onto the program area 16 and detects the amount of light being reflected from the entire width of a very small lengthwise portion of the program area 16. It will be appreciated that this amount of light will be proportional to the average or mean width of the respective lengthwise portion of the program area 16 and thus a linear function of the lengthwise distance of the portion from one end of the program area. The unit 20 in turn produces an output signal which is a function of the amount of light being detected. The signal is preferably electrical. Although the output signal may be any function of the amount of light being detected, it is for simplicity simply proportional to the amount of light.

The output signal is transmitted from unit 20 to operator means 22 and 24 via suitable electrical connecting means such as a cable 26. The circuit may include components for impedance matching or electrical gain as required and as is well known in the art. In the system shown, the signal is transmitted to two different operator means although it could be transmitted to only one or to more than two. Operator means 22 is an indicator having a pointer movable around a dial or other suitable means for indicating the angular position of shaft 10 and thus of the attached valve element. The movement of the pointer is determined by the output signal from unit 20. Operator 24 is connected to the valve actuator 12 to vary the speed of the valve actuator and thus the rotational speed of the shaft 10 and attached valve element. The speed variations effected by the operator 24 are determined by the output signal from unit 20. It should be understood that the two types of operators shown are only exemplary and that virtually any type of operator could be employed in the system.

Figure 2:
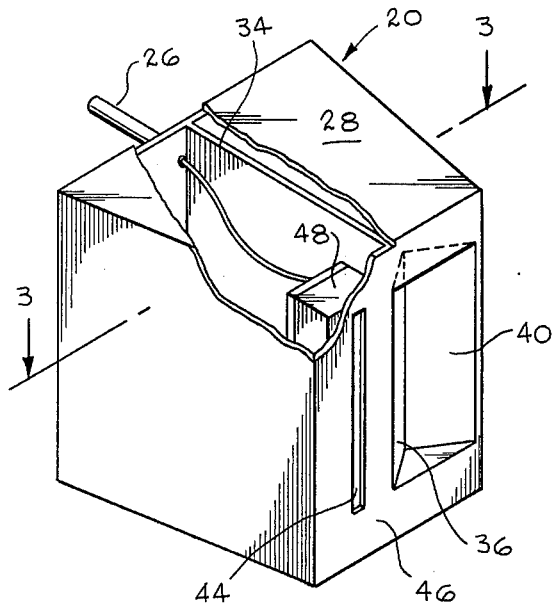
FIG. 2 is a perspective view of the light projection-detection unit of the system of FIG. 1 with parts broken away.
Figure 3:
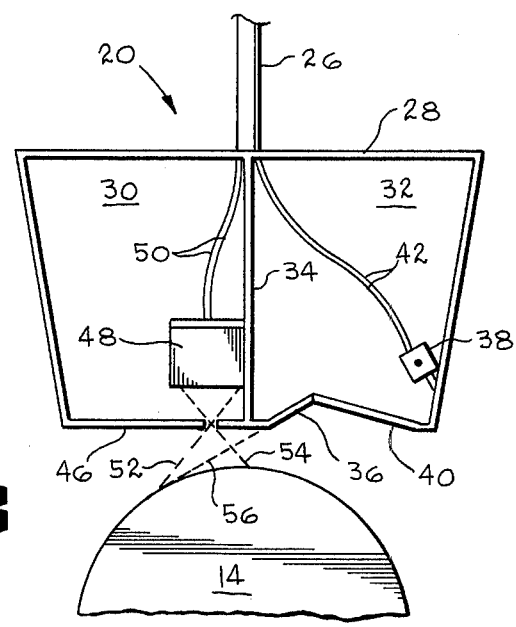
FIG. 3 is a cross-sectional view of the light projection-detection unit of FIGS. 1 and 2 shown in relation to the program carrying disc.

Referring now to FIGS. 2 and 3, the unit 20 is shown in greater detail and, for purposes of illustration, proportionately larger with respect to disc 14 than in FIG. 1. Unit 20 comprises a housing 28 forming two chambers 30 and 32. The two chambers are sealed against direct photo communication with each other by walls 34 and 36. Within chamber 32 is a light source such as a light emitting diode 38. Other light sources such as filament lamps can also be used although LED sources are preferred for their reliability. A light diffusing screen 40 of ground glass, glass bearing flashed opal, plastic or the like is disposed in front of the diode 38 to form a part of the front of housing 28, and particularly of that portion of the front of the housing which defines the front of chamber 32. Power is provided to diode 38 via electrical leads 42 which pass through chamber 32 and cable 26 and thence to a suitable power source (not shown).

Wall 46 in part defines the front of chamber 30. Wall 46 has a narrow slit 44 therein. The length of the slit 44 is great enough to admit light from the entire width of the widest part of program area 16. Since the slit 44 is preferably disposed quite close to the program area, its length is preferably about equal to the width of the widest part of the program area. Within chamber 30 facing slit 44 is a light sensing device such as a silicon photocell 48. A photomultiplier or other type of sensing device could also be used. Photocell 48 is operative to detect the amount of light entering slit 44 and produce an output signal in the form of a variable voltage which is transmitted to the operators by leads 50 which pass through chamber 30 and cable 26.

The front of the housing 28, generally comprised of walls 36 and 46 and screen 40 faces the program area 16 so that slit 44 lies transverse to the program area. For purposes of illustration, the unit 20 is shown as substantially spaced from the disc 14 and film member. In actual practice, it is preferable to place the unit as close as possible to the program area so as to exclude light from sources other than diode 38. The unit should not, however, touch the program area as this would create frictional wear. The diode 38, screen 40, and wall 36 comprise a light projecting means for projecting light onto the part of the program area aligned with the slit 44. The housing 28, including slit 44, and photocell 48 form primary detector means for detecting the amount of light reflected from a limited lengthwise portion of the program area and producing the output signal.

Due to the thickness of wall 46, the slit 44 effectively acts as a two slit system, particularly if the opposed side surfaces of the slit are non-reflective. The break in the inner surface of wall 46 formed by the slit 44 serves as one slit, and the break in the outer surface of wall 46 formed by the slit 44 serves as the other slit. It will thus be appreciated that light enters slit 44 from only that limited lengthwise portion of program area 16 which lies between lines 52 and 54. Similarly, light from slit 44 strikes only that portion of photocell 48 which lies between lines 52 and 54. Wall 36 is disposed at an angle with respect to wall 46 so as to allow light from diode 38 to strike the furthermost part of program area 16 from which light will enter the slit as indicated by the intersection of lines 52 and 56 on the program area. It will also be observed that the width of photocell 48 is sufficient to receive light from the entire area between lines 52 and 54. Thus the length of the limited lengthwise portion of the program area from which reflected light is detected is limited only by the width of the slit 44. It is noted that, just as the length of slit 44 is sufficient to admit light from the entirety of the maximum width of program area 16, i.e. at 16a, the screen 40 is long enough to illuminate an extent, transverse to the program area at least as broad as this maximum width. Similarly, the photocell 48 is long enough to receive light from the maximum width. It will be appreciated that the necessary dimensions for these various parts will depend somewhat on the spacing of the parts from the program area and from each other. The proper dimensions for given spacings can be determined by well known means by one skilled in the art of optics.

It has been noted that the length of slit 44 extends in a direction transverse to the program area 16. It is highly preferable that the slit 44 lie in a direction perpendicular to the lengthwise direction or direction of travel of the program area. However, it will be appreciated that, for at least some programs, the relative directions of the slit and program area lengths may be transverse but not strictly perpendicular. However, in either case, if the width of the program area is considered as measured in the direction of the length of the slit, this width will still be a function of mean lengthwise distance or angular displacement from one end of the program area, and the lengths of the slit, photocell, screen, etc. will always be sufficient to accommodate the maximum width of the program area.

Figure 5:
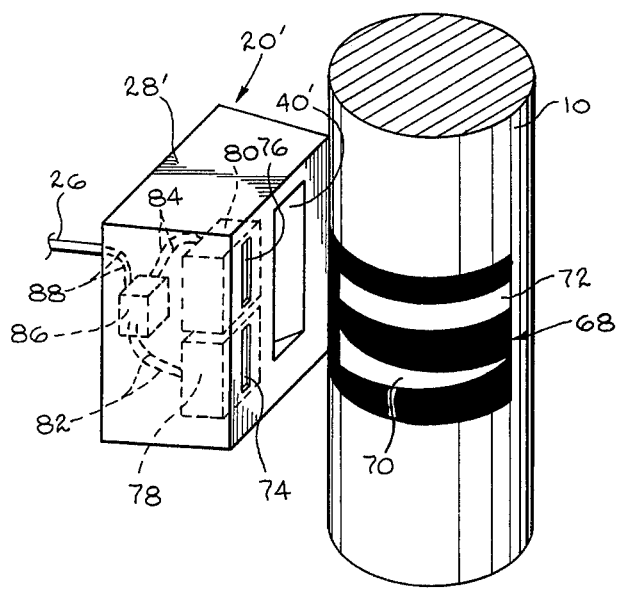
FIG. 5 is a perspective view of a rotary shaft, program carrying film and light projection-detection unit with means to compensate for dulling of the program area or light projecting means.

As mentioned above, the length of the limited lengthwise portion of the program area from which light can be detected at any given time is determined by the width of the slit 44. This arrangement is much more convenient for accurate control than limiting the lengthwise portion by means of the photocell or the light projecting means. The slit is preferably made as small as is practical and placed as close as possible to the program area so that the length of the limited lengthwise portion will be quite small. Thus very small increments of movement of the program area can be detected by the detection means which makes for a high degree of precision in the system. The precision is also enhanced by the use of the disc 14 of larger diameter than the shaft 10 and the placement of the program area at the outermost part of the disc as this provides a given point on the program area greater linear travel per degree of angular movement. It will be possible in some cases, where the shaft 10 is of sufficient diameter or where less precision and more space conservation are needed, to place the film member or other material defining the program area directly on the shaft 10 as shown in FIG. 5.

Figure 4:
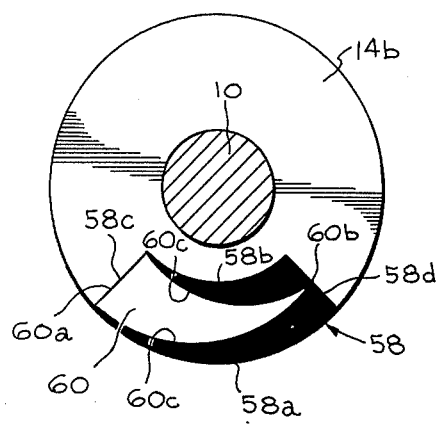
FIG. 4 is a plan view of a program carrying disc incorporating a second embodiment of the invention.
Figure 7:
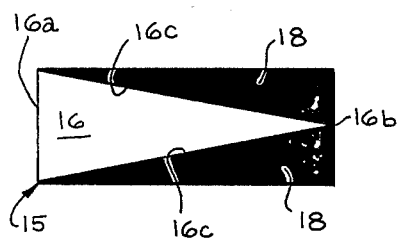
FIG. 7 is an elevational view of a film member according to the invention having a first program.
Figure 8:
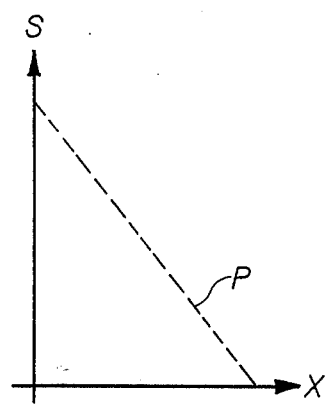
FIG. 8 is a graph plotting speed against lengthwise distance from one end of the program area for the program of FIG. 7 as applied to the rotation speed control system of FIG. 1.

The film member 15 of FIGS. 1 and 7 is rectangular when laid flat. In FIG. 4 there is shown another film member 58 which provides the same program as film member 15 but which is adapted to be placed on the axially facing surface 14b of the disc 14. Film member 58 has a long arcuate side edge 58a of the same radius of curvature as the outer edge of surface 14b at which edge 58a is disposed. The film member 58 also has a short arcuate side edge 58b parallel to edge 58a and ends 58c and 58d which are aligned with radii of the disc 14. Film member 58 carries a program area 60 whose length extends in a circumferential direction with respect to the shaft 10. Program area 60 has a wide end 60a coincident with end 58c of the film member, a pointed end 60b centered on end 58d of the film member, and side edges 60c which taper from end 60a to end 60b so that the width of the program area 60 is a linear function of either mean linear distance from or angular displacement with respect to either of the program area ends 60a and 60b. As shown, the program area 60 provides exactly the same program as program area 16 of film member 15. The light projection-detection unit used with the embodiment of FIG. 4 may be exactly the same as the unit 20 except that it will be disposed with the front of the housing facing surface 14b rather than surface 14a of the disc 14 with the slit 44 transverse to the program area 60 and preferably aligned with a radius of the disc 14.

Figure 6:
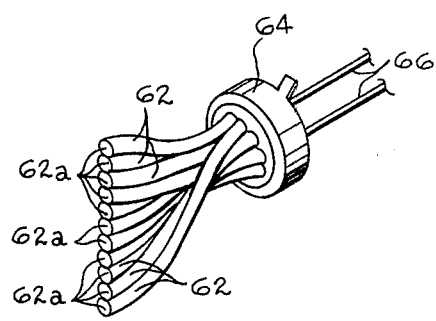
FIG. 6 is a fragmentary view of a second form of detector means.

In FIG. 6 there is shown a portion of another embodiment of the invention in which the slit 44 and photocell 48 may be replaced by a bundle of optical fibers 62 connected to a light sensing device such as a silicon p-i-n photodiode 64 which senses the amount of light carried by the fibers 62. The ends 62a of the fibers 62, referred to herein as sensor ends, are arranged in an elongate array as shown. In use, the array of ends 62a faces the program area in exactly the same way as the slit 44 of the embodiment of FIGS. 1–3. It will lie transverse to the program area and preferably at a right angle to the direction of movement of the program area. The array must be long enough to receive light from the entire width of the widest part (measured in the direction of the array) of the program area. The width of the array will determine the length of the limited lengthwise portion of the program area from which light can be received at any one time. Photodiode 64 is operative to produce the appropriate output signal in the form of a variable current and has leads 66 for transmitting this signal to the operators.

The apparatus of FIG. 6 may be placed in a housing with the ends 62a disposed in a slit in order to protect the apparatus from physical damage, dust, dampness, etc. and to help maintain the configuration of the array of ends 62a. However, this expedient is not necessary to isolate the apparatus from direct photo-communication with the light source since only light rays striking the ends 62a will be carried by the fibers. Similarly, the photodiode 64 is only responsive to light being carried by the fibers. It is desirable, however, to provide some means for fixing the apparatus of FIG. 6 with respect to the light projecting means. Otherwise, the remaining parts of the system, e.g. film member, light projecting means, operators, etc., can be identical to those of FIGS. 1–3.

It will readily be appreciated that all the functions of the light projection-detection unit may be carried out electrically so that there need be no moving parts in the unit 20. The program area does move relative to the unit 20 but does not touch it. Thus, mechanical wear is eliminated from these parts of the system. Furthermore, the use of a film element of negligible volume and weight and of electrical components makes this entire part of the system small, compact, and lightweight.

There is, however, a possibility of dulling of the reflective material of the program area and/or the light source, particularly if the latter is a filament lamp rather than the preferred LED source. FIG. 5 depicts a modified form of the invention which compensates for such dulling. The modification includes the shaft 10. A film member 68 is attached directly to the radially facing surface of shaft 10 and its outer surface comprises two generally parallel reflective areas 70 and 72 whose lengths extend in a circumferential direction with respect to the shaft 10. Area 70 is a program area substantially identical to program area 16 of FIGS. 1 and 7. Area 72 is a reference area of substantially constant width, preferably equal to the maximum width of area 70, and comprised of the same reflective material as area 70.

The modification also includes a light projection-detection unit 20' having a two-chamber housing 28'. In one chamber of the housing 28' is a light source (now shown) located behind a diffusing screen 40' at the front of the housing. The unit 20', as thus far described, is identical to unit 20 of FIGS. 1–3. Unit 20' differs from unit 20 in that the other chamber contains not one but two slits 74 and 76 aligned end-to-end each of which faces a respective one of the reflective areas 70 and 72. The slits are of identical size and each one lies transverse to its respective reflective area, preferably at right angles to the direction of motion of the areas. Behind each of the slits 74 and 76 lies a respective photocell 78 or 80 similar to photocell 48 of FIGS. 2 and 3. Photocells 78 and 80 are identical and calibrated and each is operative to detect the amount of light entering its respective slit and produce a proportional output signal. Respective leads 82 and 84 transmit the two output signals to an electronic device 86 which produces a net output signal which is proportional to the difference between the output signals of the two photocells 78 and 80. The primary detector means of the modified system comprises photocell 78 and slit 74. The auxiliary detector means of the modified system comprises photocell 80 and slit 76. The net output signal produced by device 86 is transmitted by leads 88 via cable 26 to the operators 22 and 24 which are thus directly responsive to the net output signal and indirectly responsive to the output signal of the primary detector means. It will be appreciated that the net output signal compensates for any dulling by taking the difference between the output signal resulting from the program area and the output signal resulting from the reference area. Since both areas 70 and 72 are comprised of the same material, they will fade at the same rate, and since they are both illuminated by the same light source, any dulling of the latter will be nullified by the use of the reference area.

Referring now to FIGS. 7-12, several different types of programs and the ways in which they might be applied to the system of FIG. 1 are illustrated. FIG. 7 shows the above-described film member 15 in which the width of the program area 16 varies linearly with distance from end 16a. More particularly, the width of the program area 16 is proportional to the distance from end 16a so that $w = -ax$; where $w$ = width, $x$ = distance from end 16a, and $a$ is a negative constant. The negative of $a$ is used since the width $w$ decreases from end 16a to 16b.

At this point it should be noted that in referring to characteristics of the limited lengthwise portions of the program area such as width, linear distance from one end of the program area, angular displacement with respect to one end of the program area, etc., it is actually the mean width, mean distance, etc. that is meant since the limited lengthwise portions do have some lengthwise dimension. However, this lengthwise dimension in the preferred embodiments is so small that the various values mentioned above will often be referred to herein simply as the width, distance, angular displacement, etc. The light sensing device of the primary detector means of the system, i.e. photocell, photomultiplier, photodiode or the like, can be devised so that its output signal is any desired function of the mean width of the limited lengthwise portion of the program area from which light is being detected. Preferably the output signal is proportional to the width, and, for simplicity, we will assume here that the output signal is equal to the width. The speed of the valve actuator 12 may be controlled as any desired function of the output signal. Again, the function is preferably a simple proportion and, for simplicity, we will assume that the constant of proportionality is 1 so that the speed $s$ of the valve actuator is equal to the width $w$ of the program area. Then as shown by the solid line $p$ in FIG. 9, the speed of the actuator is a decreasing linear function of the mean distance of the limited lengthwise portion of the program, from which light is then being detected, from end 16a. Line $p$ has the equation $s = -ax$. It will also be appreciated that, since the program area remains at a constant distance from the axis of rotation, linear distance from one end of the program area is proportional to angular displacement with respect to that end of the program area. Thus, it may also be said that $s = -ar\theta$; where $r$ = distance from the axis, and $\theta$ = angular displacement from the end of the program area from which $x$ is measured.

In many instances, it is desirable to regulate a valve actuator's speed so that the valve element is rotated at a relatively fast rate at and near its open position where the fluid it controls offers litle resistance and at a relatively slow rate at and near its closed position where there is more resistance. This objective can be achieved with the program of area 16. For example, the length of the program area could be made equal to one fourth the circumference of the shaft, disc, or other rotary member on which the film is to be carried. The film would be positioned on the rotary member so that wide end 16a would be aligned with the slit 44 of the detection means when the valve is in its open position and the pointed end 16b would be aligned with the slit 44 when the valve is in its closed position. Then as the valve element moved from its open position to its closed position, its speed would decrease according to the equation for line $p$. The rate of speed decrease could be determined as desired by selecting an appropriate constant of proportionality $a$ between the width of the program area and distance from end 16a, the constant $-a$ also representing the slope of the line $p$ and thus the rate of decrease in speed per unit of linear movement of the program area. If an indicator such as 22 is used in the system, its movement $\phi$ may be controlled by the same function, i.e. $\phi = -ax$.

It will be appreciated that, for the arrangement described above, the value of $x$ is increasing as the valve is rotated from its open position to its closed position. Upon reverse rotation, the value of $x$ will be decreasing, but the line $p$ will still describe the speed $s$ as a function of $x$ so that the actuator will still be moving faster near the open position of the valve and slower near the closed position. It will also be appreciated that the opposite effect could be achieved by placing the film member so that the pointed end 16b is aligned with the slit 44 when the valve is in its open position and the wide end 16a is aligned with the slit 44 when the valve is in its closed position.

Figure 9:
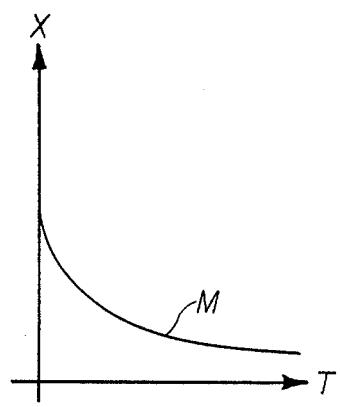
FIG. 9 is a graph plotting angular position against time for the program of FIG. 7 as applied to the rotation speed control system of FIG. 1.

As explained above, the variable $x$, representing the distance from end 16a of the limited lengthwise portion aligned with slit 44 determines the output signal of the primary detection means. However, since this output signal is transmitted back to the valve actuator to control its speed and thus that of the connected program area, the value of $x$ as a function of time is controlled by this output signal. FIG. 9 shows the way in which $x$ varies with time for the arrangement described with respect to FIG. 7. It will be appreciated that the speed $s$ of the valve actuator is also the speed of the valve element and connected rotary part on which the program area is carried. The speed $s$ can be written as $dx/dt$ where $t$ = time. Then, from the equation for $s$ we can write $dx/dt = -ax$. This latter equation is solved as follows:

$$dx/dt = -ax$$

$$dx/x = -a\,dt$$

$$\ln x = -at$$

$$x = e^{-at}.$$

This solution is shown graphically by the curve $m$ in FIG. 9 for the time period in which the valve moves from its open to its closed position.

It can be seen that $x$ changes rapidly for the smaller values of $t$ but very rapidly for greater values of $t$.

Figure 10:
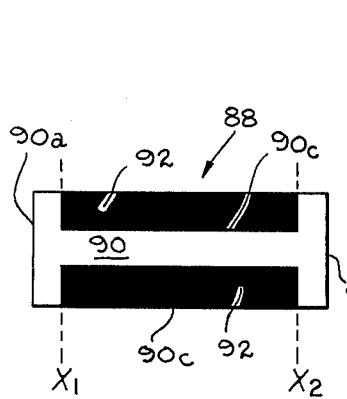
FIG. 10 is an elevational view of a film member according to the invention having a second program.
Figure 11:
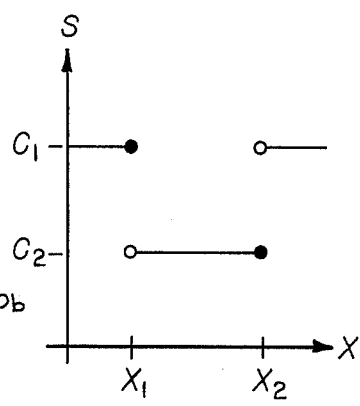
FIG. 11 is a graph similar to that of FIG. 8 for the program of FIG. 10.
Figure 12:
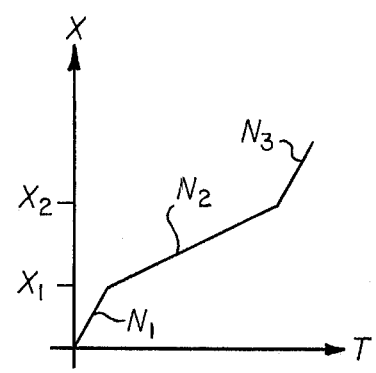
FIG. 12 is a graph similar to that of FIG. 9 for the program of FIG. 10.

Turning to FIGS. 10-12 there is shown a film member 88 having a reflective program area 90 on its forward face. The program area 90 has ends 90a and 90b corresponding to the ends of the film member 88. From end 90a to line $x_1$, whose distance from end 90a is also equal to a given value denoted by $x_1$, the width of the reflective program area is a constant $c_1$ equal to the width of the film member 88. From line $x_1$ to line $x_2$, whose distance from end 90a is also equal to a given value denoted by $x_2$, the width of the program area is a constant $c_2$ less than the width of the film member 88. In this area, the program area has side edges 90c spaced inwardly from the sides of the film member, and adjacent the side edges 90c are non-reflective areas 92. From line $x_2$ to end 90b, the width of the program area 90 is again the constant $c_1$ equal to the width of the film member 88.

FIG. 11 graphically illustrates the way in which the speed s of the valve actuator is controlled by the program of the film member 88. Again we will assume for simplicity that the speed of the actuator is equal to the width w of the program area. Then $$w = s = c_1 \text{ for } 0 \leq x < x_1 \text{ and } x_2 \leq x < x_{max}.$$

$$w = s = c_2 \text{ for } x_1 \leq x < x_2.$$

The way in which this speed function would apply to the various positions of the valve element would depend on which parts of the program area 90 are aligned with the slit 44 when the valve element is in these various positions. FIG. 12 illustrates the movement of the program area, or any given point thereon, as a function of time. The graph of FIG. 12 comprises a continuous curve including three linear segments $n_1$, $n_2$, and $n_3$. Over the segment $n_1$, x increases relatively rapidly with time from 0 to $x_1$ at a constant rate represented by the slope of segment $n_1$. Over segment $n_2$ x increases more slowly from $x_1$ to $x_2$ at a constant but lesser rate. Over the segment $n_3$, x again increases rapidly with time from $x_2$ to the maximum value of x at the same rate as in segment $n_1$.

It will be appreciated that the embodiments of FIGS. 7–9 and FIGS. 10–12 are only exemplary and that numerous other embodiments could be provided by varying the configuration of the program area and/or varying the placement of the program area with respect to the various positions of the valve element. Additionally, the output signal of the primary detector means, the width of the program area and the speed of the valve actuator have all been assumed to be equal in the above examples. However, it will be appreciated that the electrical components of the system could be devised so that the output signal of the primary detector means is any desired function of the width of the program area and the speed of the valve actuator is any desired function of the output signal. This type of variation offers even more possibilities for varying the responses to various programs. In particular, it is noted that the actuator speed can be controlled as various functions of either the width of the program area or the output signal of the primary detection means such as parabolic functions, logarithmic functions, etc. The movement of the program area with respect to time can be similarly determined by suitable functions built into the system in a manner well known to those skilled in the art.

It will readily be appreciated that the preferred embodiments of the invention described above provide numerous advantages. They are free from mechanical wear, backlash, etc. A high degree of precision and accuracy is provided, particularly when the limiting width of the slit or array of fiber ends is quite small. The systems as shown are perfect for applications involving valves and valve actuators but are also well suited for many other applications. Great versatility is provided by the use of a reflective program area, particularly if it is carried by a removable adhesive film member. The use of such film members also makes the system inexpensive, light weight, and conservative of space.

Many modifications of the preferred embodiments described above are possible without departing from the spirit of the invention. It is thus intended that the scope of the invention be limited only by the claims which follow.

I claim:

1. In combination with a rotary member, a positional sensor-operator system comprising:

a light reflective program area carried by said rotary member to rotate therewith, the length of said program area extending in a circumferential direction with respect to said rotary member and the width of said program area varying along the length of said program area as a function of lengthwise distance from one end of said program area so as to be indicative of the angular position of said rotary member and the light reflective characteristics being substantially uniform over said program area;

a reference area having light reflective characteristics substantially identical to those of said program area and carried by said rotary member to rotate therewith, the length of said reference area extending in a circumferential direction with respect to said rotary member and the width of said reference area being substantially uniform along its length;

means for projecting light onto at least a part of said program area over an extent transverse to said program area at least as broad as the maximum width of said program area and further operative to project light onto at least a part of said reference area over an extent transverse to said reference area at least as broad as the width of said reference area;

primary detector means operative to detect the amount of light being reflected from the entire width of a limited lengthwise portion of said program area aligned with said primary detector means, said primary detector means being disposed opposite said program area whereby successive lengthwise portions of said program area will pass and primary detector means as said rotary member is rotated, said primary detector means further being operative to produce an output signal which is a function of the width of said program area;

auxiliary detector means disposed opposite said reference area and operative to detect the amount of light being reflected from a limited lengthwise portion of said reference area aligned with said auxiliary detector means, said auxiliary detector means further being operative to produce an output signal which is proportional to the amount of light being reflected from the aligned portion of said reference area;

means for producing a net output signal which is a function of the difference between the output signal of said primary detector means and the output signal of said auxiliary detector means;

and operator means operably connected to said means for producing said net output signal to receive said net output signal and produce a programmed response thereto.

2. The combination of claim 1 wherein said operator means comprises indicator means for indicating the angular position of said rotary member.

3. The combination of claim 2 wherein said rotary member is a shaft connected to and rotating with a rotary valve element whereby said indicator means indicates the angular position of said valve element.

4. The combination of claim 1 wherein said rotary member is a shaft connected to and rotating with a rotary valve element.

5. The combination of claim 4 further comprising valve actuator means for rotating said shaft and valve element, and wherein said operator means is connected to said valve actuator means to control the speed of said valve actuator as a function of said output signal.

6. The combination of claim 2 wherein said primary detector means is spaced from said program area.

7. The combination of claim 1 wherein said primary detector means comprises a housing having a first chamber therein and also having a slit through said housing to said first chamber, said slit being disposed opposite said program area and transverse thereto, the length of said slit being sized to admit light from the entirety of the maximum width of said program area and the width of said slit being less than the length of said program area, said primary detector means further comprising a light sensing device in said chamber opposite said slit and sized and spaced from said slit so as to sense the amount of light entering said slit from the entirety of the aligned limited lengthwise portion of said program area and produce said output signal.

8. The combination of claim 7 wherein the length of said limited lengthwise portion of said program area is determined by the width of said slit.

9. The combination of claim 7 wherein said light sensing device comprises a photocell.

10. The combination of claim 7 wherein said housing has a second chamber therein, said light projection means being disposed within said second chamber, said first and second chambers being sealed against direct photo communication with each other, said housing having means for directing light out of said second chamber to the portion of said program area aligned with said slit.

11. The combination of claim 10 wherein said housing comprises means for diffusing the light passing out of said second chamber.

12. The combination of claim 1 wherein said primary detector means comprises a plurality of optical fibers each having a sensor end, said sensor ends being arranged adjacent one another to form an elongate array disposed opposite said program area and transverse thereto, the length of said array being sized to receive light from the entirety of the maximum width of said program area and the width of said array being less than the length of said program area, said primary detector means further comprising a sensing device attached to said optical fibers and operative to sense the amount of light being carried by said fibers and produce said output signal.

13. The combination of claim 12 wherein said sensing device comprises a p-i-n photodiode.

14. The combination of claim 1 wherein the width of said program area varies linearly along its length.

15. The combination of claim 1 wherein said rotary member is a shaft and said program area is carried directly by said shaft on the radially directed surface thereof.

16. The combination of claim 1 wherein said rotary member is a shaft and further comprising a disc member rigidly mounted on said shaft concentric therewith, and wherein said program area is disposed on said disc member.

17. The combination of claim 16 wherein said program area is disposed on the radially facing surface of said disc member.

18. The combination of claim 16 wherein said program area is disposed on an axially facing surface of said disc.

19. The combination of claim 16 wherein said program area is disposed on one face of a film member, said film member being carried by said rotary member.

20. The combination of claim 19 wherein said film member is removable from said rotary member.

21. The combination of claim 20 including an adhesive material on the opposite face of said film member from said program area.

22. The combination of claim 19 wherein said film member further comprises a non-reflective area adjacent the narrower portions of said program area.

23. The combination of claim 10 wherein said housing has another slit therethrough to said first chamber, said other slit being disposed opposite said reference area and transverse thereto, the length of said other slit being sized to admit light from the entirety of the width of said reference area and the width of said other slit being less than the length of said reference area, said housing having means for directing light out of said second chamber to the portion of said reference area aligned with said other slit, and said auxiliary detector means comprising another light sensing device in said first chamber opposite said other slit and sized and spaced from said other slit so as to sense the amount of light entering said other slit from the entirety of the aligned limited lengthwise portion of said reference area and produce said output signal.

24. The combination of claim 1 wherein said program area and said reference area are disposed generally parallel to each other.

* * * * *